March 14, 1933.  W. A. MARRISON  1,901,400
HARMONIC ANALYZER
Filed Aug. 27, 1931
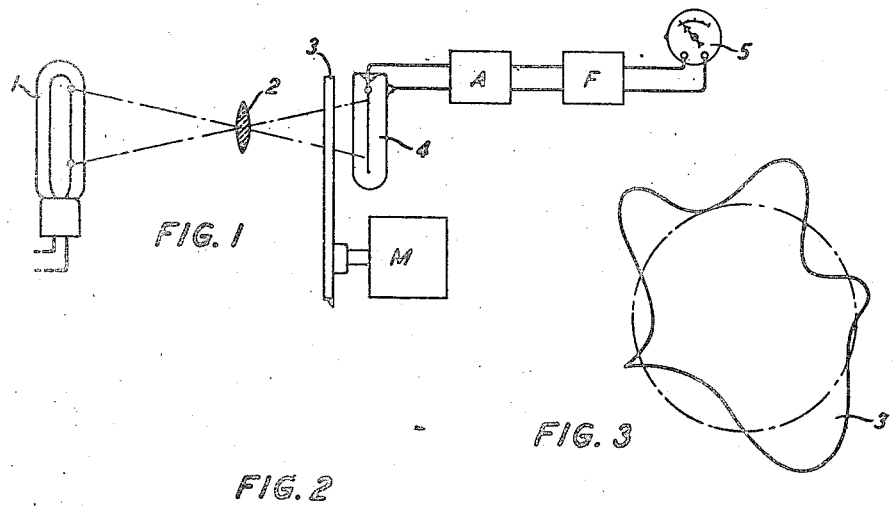
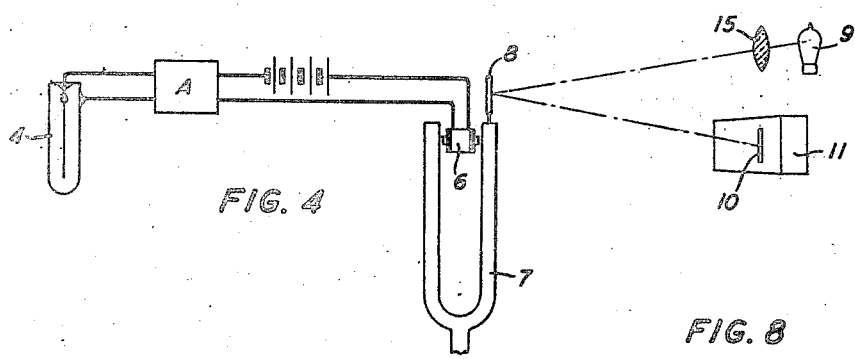
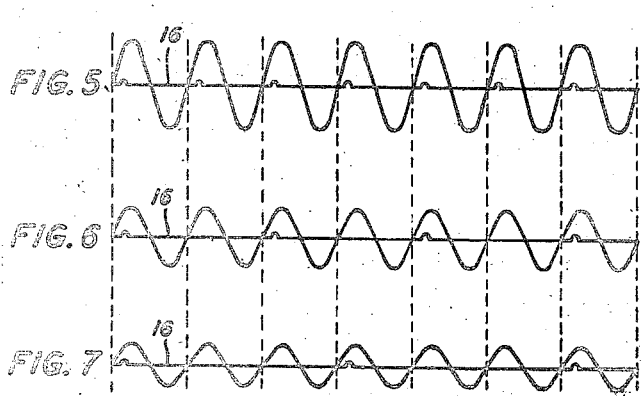
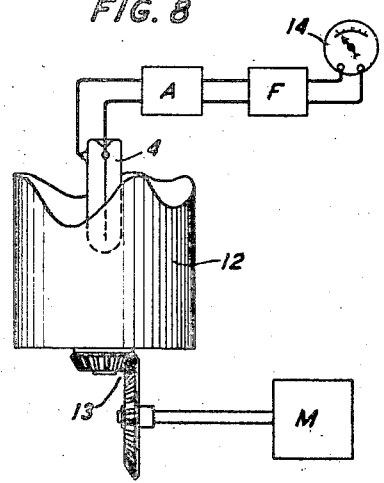
INVENTOR
W. A. MARRISON
BY Guy T. Morris
ATTORNEY Patented Mar. 14, 1933

1,901,400

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

HARMONIC ANALYZER

Application filed August 27, 1931. Serial No. 559,605.

It is useful for many purposes to know what components of harmonic frequencies are present in a wave, for instance an electric wave, and to know the amplitudes and phase relationships of these components. The object of this invention is to provide means for, and a method of, obtaining this information.

A feature of one species of this invention is the use of a disc whose periphery has been cut to represent, in polar coordinates, the wave to be analyzed.

A feature of another species of this invention is the use of a cylinder whose rim has been cut to represent the wave to be analyzed.

In the system described herein the periphery of a disc is cut to represent the wave in polar coordinates so that one complete cycle of the wave to be analyzed is represented by the entire periphery of the disc. This disc is mounted on a shaft and rotated between a source of light and a photoelectric cell, so that the light falling on the cell corresponds exactly to the wave form to be analyzed. The output from the photoelectric cell therefore is an electric wave having a fundamental frequency equal to the speed of the disc in revolutions per second and having the same harmonic content as the original wave.

If the output from the photoelectric cell passes into a detector tuned for, say, 100 cycles, and if the disc is rotated at 100 revolutions per second the output from the detector will be a measure of the amplitude of fundamental in the original wave. If the disc is rotated at 50 revolutions per second, the 100 cycle component measured will be the second harmonic of the original wave. If the disc is rotated at $$\frac{100}{n}$$

revolutions per second, the 100 cycle component measured will be the $n$th harmonic of the original wave.

In an alternative arrangement the rim of a cylinder is cut to represent the wave in rectangular coordinates, and the photoelectric cell may be placed inside the cylinder while the source of light is outside the cylinder, so that the rim of the cylinder varies the light beam in accordance with the wave to be measured.

In order to determine the phase and amplitude relation of the harmonics a resonant oscillograph is substituted for the meter. By this means a graphical record may be made of the amplitude and phase of each component.

In the drawing,

Fig. 1 is a schematic diagram of apparatus comprising the invention, with a meter in the output circuit;

Fig. 2 is a graphical representation of one cycle of the wave to be analyzed;

Fig. 3 is a front elevation of the disc, showing its periphery cut in accordance with the wave of Fig. 2;

Fig. 4 is a schematic diagram of that part of Fig. 1 including the circuit of the photoelectric cell and the circuits following, with a tuned oscillograph substituted for the meter;

Fig. 5 is a graphical representation of the fundamental (or first harmonic) of the wave as it would be recorded on the oscillograph;

Fig. 6 is a graphical representation of the second harmonic component;

Fig. 7 is a graphical representation of the third harmonic component; and

Fig. 8 is a diagram, partly in section, of a cylinder of the invention showing the photoelectric cell and circuits following.

In the system of Fig. 1 a strip source of light 1 is focused by a lens 2 on a disc 3, forming a narrow strip image thereon. The disc, which is driven by a motor M, has its periphery cut in accordance with Fig. 3 to represent the wave to be analyzed, in polar coordinates.

If only a single period of the wave to be analyzed is represented on the disc it is driven at such a speed that the harmonic under consideration has the frequency for which the filter is selective. That is, if the filter is selective at 100 cycles per second and it is desired to measure the fundamental of the wave, the disc is driven at 100 revolutions per second. If it is desired to measure the second harmonic the disc is driven at 50 cycles per second and this harmonic will then have a frequency of 100 cycles per second and may be measured, etc.

If more than a single period is represented the disc is driven correspondingly slower. That is, if two periods are represented it is driven one half as fast, if three periods are represented one third as fast, etc.

A photoelectric cell 4 is mounted behind the disc from the light source, so that it receives a varying amount of light depending on the amount of the disc which is cut away. A fluctuating current is thus produced in the cell. This current is amplified in the amplifier A and passed through a filter F selective at a fixed frequency, say, 100 cycles. The filter may be a mechanical filter such as that disclosed in United States Patent 1,708,945 issued April 16, 1929 to J. W. Horton, for example. A meter 5 is connected in the output circuit of the filter for indicating the value of the current in this circuit. When the speed of the disc is 100 revolutions per second, the meter reading is proportional to the content of fundamental in the original wave. The disc is then rotated at one half this speed and the meter reading indicates the amount of current of the second harmonic present in the wave. The disc is then rotated at one third this speed and the meter indicates the amount of current of the third harmonic present. The process may be continued until the wave has been analyzed sufficiently for the purposes of the study.

If it is desired to make a graphical representation of the phase and amplitude of each component present in the wave under investigation, the filter F and meter 5 may be replaced by a tuned oscillograph, as shown in Fig. 4.

In the operation of the system of Fig. 4 all the elements of the system of Fig. 1 are used in the manner described in connection with that figure up to and including the amplifier A. Following the amplifier is a tuned oscillograph comprising a coil 6 and a mechanical vibrating element 7 having attached thereto a mirror 8. A beam of light from a light source 9 is directed toward the mirror through a lens 15 and reflected through a slit 10 onto a roll of film in a film box 11. When the disc is rotating at full speed it will then make an oscillograph record of the fundamental component such as that shown in Fig. 5, at one half speed it will make a record of the second harmonic component such as that shown in Fig. 6, and at one third speed it will make a record of the third harmonic component such as shown in Fig. 7, etc. Suitable contact mechanism may be provided on the motor for making a mark on the record for each revolution of the disc, such as mark 16 (Figs. 5, 6 and 7). The record will then indicate the amplitude and phase of each component.

Fig. 8 shows an alternative arrangement in which a cylinder 12 has its rim cut to represent the wave to be analyzed. The cylinder is rotated by motor M through gear 13. The photoelectric cell 4 may be placed inside the cylinder, so that only one edge of the cylinder is between it and the light source. The impulses in the cell are amplified in the amplifier A, filtered in the filter F and measured in the meter 14 as in Fig. 1. The cylinder may be made by first making an ordinary oscillogram of the wave to be analyzed, wrapping it around the cylinder, and cutting the rim of the cylinder down to the wave.

The oscillograph shown in Fig. 4 may of course be substituted for the meter 14 in this alternative arrangement.

Impulses to mark each cycle of the wave on the film, when the oscillograph is used may be obtained by suitable contact mechanism on the motor, or in any other manner desired.

It is to be understood of course that many alternatives are available for the auxiliary apparatus described herein and that many changes may be made in the design of apparatus to perform the function described without departing from the scope of my invention.

What is claimed is:

1. A wave analyzer comprising in combination a source of light, a light responsive device, a disc between said source and said device whose periphery has been cut to represent a wave to be analyzed in polar coordinates, means for rotating said disc sequentially at speeds proportional to the frequencies of the wave component in the wave to be analyzed, and means for obtaining an indication of the current in said light responsive device.

2. A wave analyzer comprising an element whose periphery has been cut to correspond with a wave to be analyzed, means for turning said element, and means for obtaining an indication of the relative value of the fundamental and harmonic components present in said wave.

3. A wave analyzer comprising an eleelement whose periphery has been cut to correspond with a wave to be analyzed, said element being of disc shape, means for turning said element, and means for obtaining an indication of the contour of its periphery.

4. A wave analyzer comprising an element whose periphery has been cut to correspond with a wave to be analyzed, said element being of cylindrical shape, means for turning said element, and means for obtaining an indication of the contour of its periphery.

5. A wave analyzer comprising in combination a light source, a light responsive device, a cylindrical member whose rim has been cut to represent a wave to be analyzed interposed between said source and said device, means for rotating said member at a speed proportional to a component frequency of the wave to be analyzed, and means for obtaining an indication of the current in said light responsive device.

6. A wave analyzer comprising a rotatable element whose boundary in a plane normal to the axis of rotation has been made to conform in shape with a wave to be analyzed, means for rotating said element, and means for obtaining an oscillograph record of each component of the wave under analysis.

7. A wave analyzer comprising a disc shaped element whose periphery has been cut to correspond with a wave to be analyzed, means for turning said element, and means for obtaining an oscillograph record of each component of the wave under analysis.

8. A wave analyzer comprising a cylindrical element whose rim has been cut to correspond with a wave to be analyzed, means for turning said element, and means for obtaining an oscillograph record of each component of the wave under analysis.

9. The method of analyzing a wave whose form is known which consists in making a cast having undulations corresponding to said wave form, rotating said cast at a speed proportional to a given harmonic component of the wave to be analyzed, projecting light through said undulations, and translating the light projecting through said undulation into corresponding electrical variations.

10. A wave analyzer comprising in combination a source of light, a light responsive device, an element whose rim has been cut to represent a wave to be analyzed interposed between said source of light and said light responsive device, means for focusing light from said source on said element, means for turning said element at a speed proportional to the frequency of the component to be analyzed, means for amplifying the impulses in said light responsive device, a filter connected to said amplifying means, and means for recording the wave passing through said filter.

In witness whereof, I hereunto subscribe my name this 26 day of August 1931.

WARREN A. MARRISON.